(12) United States Patent
Wu

(10) Patent No.: US 12,262,391 B2
(45) Date of Patent: Mar. 25, 2025

(54) PHYSICAL CHANNEL MONITORING METHOD AND TERMINAL DEVICE

(71) Applicant: GUANGDONG OPPO MOBILE TELECOMMUNICATIONS CORP., LTD., Guangdong (CN)

(72) Inventor: Zuomin Wu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 341 days.

(21) Appl. No.: 17/835,060

(22) Filed: Jun. 8, 2022

(65) Prior Publication Data

US 2022/0303961 A1 Sep. 22, 2022

Related U.S. Application Data

(63) Continuation of application No. PCT/CN2020/081463, filed on Mar. 26, 2020.

(51) Int. Cl.
*H04W 72/23* (2023.01)
*H04L 1/00* (2006.01)
*H04W 72/044* (2023.01)

(52) U.S. Cl.
CPC ........... *H04W 72/23* (2023.01); *H04L 1/0038* (2013.01); *H04W 72/044* (2013.01)

(58) Field of Classification Search
CPC .... H04W 74/08; H04W 72/042; H04W 72/23
See application file for complete search history.

(56) References Cited

U.S. PATENT DOCUMENTS

| 10,462,772 B2 | 10/2019 | Feng |
| 2016/0043841 A1 | 2/2016 | Lunttila et al. |
| 2016/0192335 A1 | 6/2016 | Kusashima |
| 2017/0195999 A1 | 7/2017 | Feng et al. |
| 2020/0351847 A1* | 11/2020 | Kim ............... H04L 5/0094 |
| 2021/0144717 A1 | 5/2021 | Tsai et al. |
| 2021/0243741 A1* | 8/2021 | Lin ............... H04W 76/28 |
| 2022/0132563 A1* | 4/2022 | Kim ............... H04W 74/08 |
| 2023/0068855 A1* | 3/2023 | Ouchi ............... H04W 72/23 |

(Continued)

FOREIGN PATENT DOCUMENTS

| CN | 106332062 A | 1/2017 |
| CN | 110324883 A | 10/2019 |

(Continued)

OTHER PUBLICATIONS

Huawei et al. "Corrections on PDCCH/GC-PDCCH monitoring procedure in TS38.213" 3GPP TSG RAN WG1 Meeting #100-e R1-2000195, Feb. 24-Mar. 6, 2020 (Year: 2020).*

(Continued)

*Primary Examiner* — Derrick W Ferris
*Assistant Examiner* — Won Jun Choi
(74) *Attorney, Agent, or Firm* — PERKINS COIE LLP

(57) ABSTRACT

A physical channel monitoring method and a terminal device are provided. The method included: a terminal device being configured with at least one serving cell group; and the terminal device performing PDCCH monitoring on a first serving cell according to a first serving cell group, wherein the first serving cell is a serving cell included in the first serving cell group, and the first serving cell group is a serving cell group in the at least one serving cell group.

15 Claims, 9 Drawing Sheets

(56) References Cited

U.S. PATENT DOCUMENTS

| | | | | |
|---|---|---|---|---|
| 2023/0155746 A1* | 5/2023 | Ouchi | ............... | H04W 72/232 370/329 |
| 2023/0156572 A1* | 5/2023 | Reial | ............... | H04W 52/0229 370/329 |
| 2024/0015705 A1* | 1/2024 | You | ............... | H04W 72/0446 |

FOREIGN PATENT DOCUMENTS

| | | |
|---|---|---|
| CN | 110474737 A | 11/2019 |
| CN | 110474751 A | 11/2019 |
| CN | 110830225 A | 2/2020 |
| EP | 3018855 A1 | 5/2016 |
| EP | 4102758 A1 | 12/2022 |
| RU | 2608756 C2 | 1/2017 |

OTHER PUBLICATIONS

Second Office Action of the Chinese application No. 202210687348. 7, issued on Jan. 25, 2024, 11 pages with English translation.

Notice of Allowance of the Chinese application No. 202210687348. 7, issued on Apr. 12, 2024, 6 pages with English translation.

Notice of Allowance of the European application No. 20927432.3, issued on Feb. 6, 2024, 66 pages.

First Office Action of the Japanese application No. 2022-546141, issued on Mar. 29, 2024, 6 pages with English translation.

Hearing Notice of the Indian application No. 202217033278, issued on Feb. 28, 2024, 2 pages with English translation.

International Search Report in the international application No. PCT/CN2020/081463, mailed on Dec. 16, 2020.

3GPP TSG RAN WG1 #100-E R1-2000468, Athens, Greece, Feb. 24-28, 2020, Source: OPPO, Title: Discussion on the remaining issues of DL signals and channels, Agenda Item: 7.2.2.1.2, Document for: Discussion and Decision.

3GPP TSG RAN WG1 Meeting #100-e R1-2000195, Feb. 24-Mar. 6, 2020, Agenda Item: 7.2.2.1.2, Source: Huawei, HiSilicon, Title: Corrections on PDCCH/GC-PDCCH monitoring procedure in TS38. 213, Document for: Discussion and Decision.

First Office Action of the European application No. 20927432.3, issued on Jul. 6, 2023. 5 pages.

First Office Action of the Chinese application No. 202210687348.7, issued on Jul. 12, 2023. 14 pages with English translation.

First Office Action of the Russian application No. 2022124724, issued on Jul. 21, 2023. 10 pages with English translation.

Motorola Mobility, Lenovo "Agreements from email discussion [100e-NR-unlic-NRU-DL_Signals_and_Channels-03] on search space set monitoring/switching" 3GPP TSG RAN WG1#100e R1-2001389, Feb. 24-Mar. 6, 2020, Agenda Item: 7.2.2.1.2. 30 pages.

OPPO "Discussion on the remaining issues of DL signals and channels" 3GPP TSG RAN WG1 #103-e R1-2008247, e-Meeting, Oct. 26-Nov. 13, 2020. 2 pages.

Supplementary European Search Report in the European application No. 20927432.3, mailed on Oct. 21, 2022. 11 pages.

Nokia, Nokia Shanghai Bell "Remaining issues on DL signals and channels" 3GPP TSG RAN WG1 Meeting #100e R1-2000501, e-Meeting, Feb. 24-28, 2020, Agenda item: 7.2.2.1.2. 16 pages.

First Office Action of the Indian application No. 202217033278, issued on Nov. 16, 2022. 7 pages with English translation.

Written Opinion of the International Search Authority in the international application No. PCT/CN2020/081463, mailed on Dec. 16, 2020. 9 pages with English translation.

First Office Action of the Singaporean application No. 11202251844Q, issued on Nov. 27, 2024. 10 pages.

First Office Action of the Israeli application No. 295815, issued on Dec. 22, 2024. 4 pages with English translation.

* cited by examiner

PHYSICAL CHANNEL MONITORING METHOD AND TERMINAL DEVICE

CROSS-REFERENCE TO RELATED APPLICATIONS

The present disclosure is a U.S. continuation application of International Application No. PCT/CN2020/081463, filed on Mar. 26, 2020. The content of the International Application No. PCT/CN2020/081463 is incorporated herein by reference in its entirety.

BACKGROUND

Generally, in the NR based access to unlicensed spectrum (NR-U) system, a terminal can be configured with two search space groups (SS groups) on a serving cell. Sometimes, the search space group is also called a search space sets group (SSS group), and is used for monitoring the physical downlink control channel (PDCCH).

For the case where it is determined that two SS groups are configured, the terminal determines that it is needed to perform monitoring on PDCCH in one of the two SS groups within a period of time.

SUMMARY

The present disclosure relates to the field of communication, and more particularly, to a method for monitoring physical channel and terminal device.

In view of this, the embodiments of the present disclosure provide a method for monitoring physical channel and a terminal device, which can be used for determining a switching manner of the terminal for the search space groups on at least one serving cell in the serving cell group.

The embodiments of the present disclosure provide a method for monitoring physical channel. The method includes the following operations.

The terminal device is configured with at least one serving cell group. The terminal device performs physical downlink control channel (PDCCH) monitoring on a first serving cell according to a first serving cell group. The first serving cell is a serving cell included in the first serving cell group, and the first serving cell group is a serving cell group in the at least one serving cell group.

The embodiments of the present disclosure also provide a terminal device. The terminal device includes a physical channel monitoring module.

The physical channel monitoring module is configured to perform PDCCH monitoring on a first serving cell according to a first serving cell group in a case that the terminal device is configured with at least one serving cell group. The first serving cell is a serving cell included in the first serving cell group, and the first serving cell group is a serving cell group in the at least one serving cell group.

The embodiments of the present disclosure further provide a terminal device. The terminal device includes a processor and a memory. The memory is configured to store a computer program. The processor invokes and executes the computer program stored in the memory, and performs the above method for monitoring physical channel.

The embodiments of the present disclosure further provide a chip. The chip includes a processor. The processor is configured to invoke and execute a computer program from a memory, so that a device equipped with the chip performs the above method for monitoring physical channel.

The embodiments of the present disclosure further provide a computer-readable storage medium for storing a computer program. The computer program causes a computer to perform the above method for monitoring physical channel.

The embodiments of the present disclosure further provide a computer program product. The computer program product includes computer program instructions. The computer program instructions cause a computer to perform the above method for monitoring physical channel.

The embodiment of the present disclosure also provide a computer program, the computer program causes a computer to perform the above method for monitoring physical channel.

DETAILED DESCRIPTION

Figure 1:
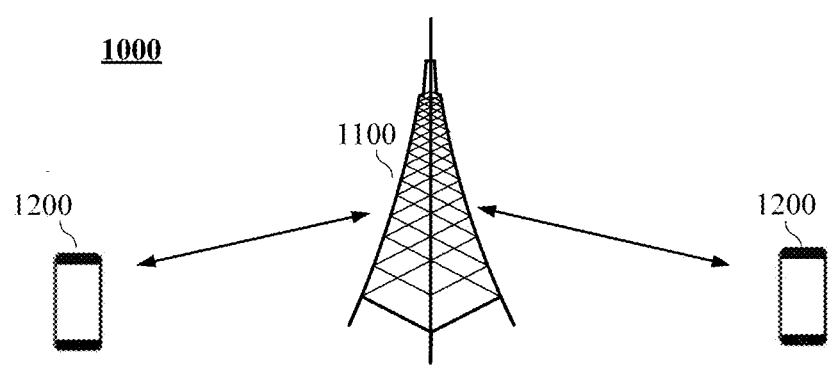
FIG. 1 is a schematic diagram of communication system architecture according to some embodiments of the present disclosure.

Currently, on one serving cell, the terminal can support switching from PDCCH monitoring based on the search space set corresponding to the first group of identifiers to PDCCH monitoring based on the search space set corresponding to the second group of identifiers, and vice versa. However, for one serving cell group among the multiple serving cell groups, how to determine the switching behavior of the terminal for the search space groups on the multiple serving cells in the serving cell group is a problem that needs to be studied at present.

According to the embodiments of the present disclosure, if a terminal device is configured with at least one serving cell group, for the first serving cell group in the at least one serving cell group and the first serving cell in the first serving cell group, the terminal device performs PDCCH monitoring on the first serving cell according to the first serving cell group, so that the switching behavior of the terminal device for the search space groups on the at least one serving cell in the serving cell group in at least one serving cell group can be determined.

The technical solutions in the embodiments of the present disclosure will be described below with reference to the accompanying drawings in the embodiments of the present disclosure.

The technical solutions of the embodiments of the present disclosure can be applicable for various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system or other communication systems, etc.

Generally speaking, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication etc. The embodiments of the present disclosure can also be applicable for these communication systems.

Optionally, the communication system in the embodiments of the present disclosure may be applicable for a Carrier Aggregation (CA) scenario, a Dual Connectivity (DC) scenario, or a Standalone (SA) network layout scenario.

Optionally, the communication system in the embodiments of the present disclosure may be applicable for an unlicensed spectrum. The unlicensed spectrum may also be regarded as a shared spectrum. Optionally, the communication system in the embodiments of the present disclosure may also be applicable for a licensed spectrum.

The embodiments of the present disclosure describe the various embodiments in conjunction with network device and terminal device. The terminal device may also be referred to as a User Equipment (UE), an access terminal, a user unit, a user station, a mobile station, a mobile terminal, a remote station, a remote terminal, a mobile device, a user terminal, a terminal, a wireless communication device, a user agent or a user device, etc.

The terminal device may be a STAION (ST) in the WLAN, and may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing devices connected to wireless modems, an in-vehicle device, a wearable device, a terminal device in next-generation communication system such as a NR network, or a terminal device in an further evolved Public Land Mobile Network (PLMN) network, etc.

In the embodiments of the present disclosure, the terminal device may be deployed on land, including indoor or outdoor, handheld, wearable, or vehicle-mounted. The terminal device may also be deployed on water (such as ships, etc.). The terminal device may also be deployed in the air (such as airplanes, balloons, and satellites).

In the embodiments of the present disclosure, the terminal device may be a Mobile Phone, a Pad, a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or a wireless terminal device in smart home, etc.

As an example and not a limitation, in the embodiments of the present disclosure, the terminal device may also be a wearable device. The wearable device may also be called a wearable smart device, which is the general term for the wearable device that is developed using wearable technology for intelligently designed daily wear, such as glasses, gloves, watches, clothing and shoes. A wearable device is a portable device that is worn directly on the body or integrated into the user's clothing or accessories. The wearable device is not only a hardware device, but also implements powerful functions through software support, data interaction, and cloud interaction. In a broad sense, the wearable smart device includes a device that is full-featured, large-scale, capable of implementing complete or partial functions without relying on a smart phone, such as a smart watches or a smart glass, and a device that only focus on a certain type of application function, and needs to cooperate with other devices such as smart phones, such as all kinds of smart bracelets for physical sign monitoring and smart jewelry, etc.

In the embodiments of the present disclosure, the network device may be a device for communicating with mobile devices, and the network device may be an Access Point (AP) in WLAN, or a Base Transceiver Station (BTS) in GSM or CDMA. The network device may also be a NodeB (NB) in WCDMA. The network device may also be an Evolutional Node B (eNB or eNodeB) in LTE, or a relay station or access point, or an in-vehicle device, a wearable device, a network device (gNB) in NR network or a network device in the future evolved PLMN network, etc.

As an example and not a limitation, in the embodiments of the present disclosure, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, and a High Elliptical Orbit (HEO) satellite etc. Optionally, the network device may also be a base station set in a location such as land or water.

In the embodiments of the present disclosure, a network device may provide services for a cell, and a terminal device communicates with the network device through transmission resources (for example, frequency domain resources, or spectrum resources) used by the cell. The cell may be a cell corresponding to a network device (for example, a base station). The cell may belong to a macro base station, or it may belong to a base station corresponding to a Small cell. Herein, the Small cell may include a Metro cell, a Micro cell, a Pico cell and a Femto cell, etc. These Small cells have the characteristics of small coverage and low transmit power, and are suitable for providing high-speed data transmission services.

FIG. 1 schematically shows one network device 1100 and two terminal devices 1200. Optionally, the wireless communication system 1000 may include multiple network devices 1100, and the coverage of each network device 1100 may include other numbers of terminal devices 1100. The embodiments of the present disclosure do not limit this. Optionally, the wireless communication system 1000 shown in FIG. 1 may further include other network entities such as a Mobility Management Entity (MME), an Access and Mobility Management Function (AMF), etc. The embodiments of the present disclosure do not limit this.

It should be understood that the terms "system" and "network" are often used interchangeably herein. The term "and/or" herein is used to describe the association relationship of associated objects, for example, it represents that there may be three relationships between the associated objects before and after. For example, A and/or B may represent the following three cases: A exists alone, A and B exist simultaneously, and B exists alone. The character "/" in the present disclosure generally represents that the relation of between the associated objects before and after is "or".

In order to clearly illustrate the idea of the embodiments of the present disclosure, firstly, a brief description is given for a switching processing process of search space groups on a serving cell in a communication system. The embodiments of the present disclosure include at least part of the following contents.

In a communication system such as an NR-U system, when a search space (SS) is configured for a UE, the configuration parameters corresponding to the search space may include a search space group identifier (ID) parameter, such as searchSpaceGroupIdList-r16. If the UE is configured with a search space group ID parameter, then the search space group ID parameter may indicate that the search space includes one of the following three cases.

The search space group ID corresponding to the search space is the first group ID, for example, the search space corresponds to group 0, or the search space belongs to group 0.

The search space group ID corresponding to the search space is the second group ID, for example, the search space corresponds to group 1, or the search space belongs to group 1.

The search space group ID not only corresponds to the first group ID, but also corresponds to the second group ID. For example, the search space corresponds to group 0 and group 1, or the search space belongs to both group 0 and group 1.

Optionally, the UE may be configured with search space switching group indication parameters. If the UE is provided with a search space switching group indication parameter, such as searchSpaceSwitchingGroupList-r16, which indicates one or more serving cell groups, then for one serving cell group in the one or more serving cell groups, when the UE performs PDCCH monitoring, the switching behaviors of the SS groups on all cells in the serving cell group are the same. Otherwise, if the UE is provided with the search space group ID parameter, when the UE performs PDCCH monitoring, only the switching is performed on the SS groups of the serving cell.

Optionally, the UE may be provided with a timer, and the timing unit of the value of the timer may be a slot. For example, after the timer is started, the value of the timer is subtracted by 1 every time one slot passes. The value of the timer may be configured by the high layer, for example, may be provided by the high layer parameter searchSpaceSwitchingTimer-r16.

The switching of search space (SS) groups performed by UE may be implemented in an explicit switching manner, or may be implemented in an implicit switching manner.

Regarding the explicit switching, the terminal device may be configured with switching indication signaling, used for indicating the switching of SS groups, in Downlink Control Information (DCI) format 2_0, and the terminal device may also perform the switching of SS groups according to the indication of switching indication signaling in the detected DCI format 2_0. Regarding the implicit switching, the terminal device may determine whether to switch to, for example, the SS set corresponding to the second group identifier according to whether DCI is detected, for example, in the SS set corresponding to the first group identifier.

Based on FIG. 2, FIG. 3 and FIG. 4, the implicit switching manner on a serving cell is further described in detail below. For a serving cell, if the UE is not provided with switching indication signaling, for example, in DCI format 20, the UE is not provided by the network device or is not configured by the network device with the SearchSpaceSwitchTrigger-r16 parameter corresponding to the serving cell, and/or the serving cell does not belong to any serving cell group, then on the serving cell, the switching process of the SS groups may include at least one of the following cases.

Figure 2:
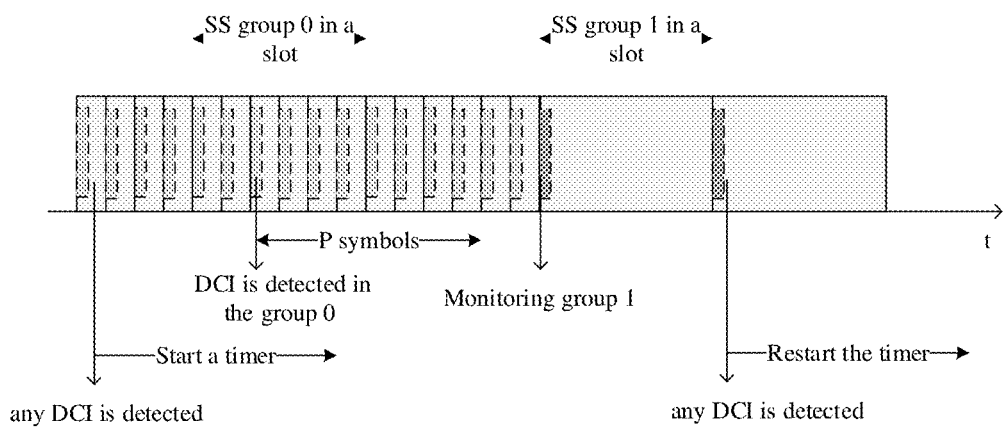
FIG. 2 is a schematic diagram of the principle and effect of the implicit switching of search space groups when the terminal device performs physical channel monitoring.

1) Referring to FIG. 2, if a DCI format is detected by the UE when performing PDCCH monitoring according to a search space set corresponding to the first group identifier, then the UE performs, starting from a first slot after at least P symbols after a last symbol of the PDCCH carrying the DCI format, PDCCH monitoring according to the search space set corresponding to the second group identifier, and stops performing PDCCH monitoring according to the search space set corresponding to the first group identifier.

2) If a DCI format is detected by the UE when performing PDCCH monitoring in any search space set, the UE sets or resets the timer to the value configured by a higher layer parameter such as searchSpaceSwitchingTimer-r16.

Figure 3:
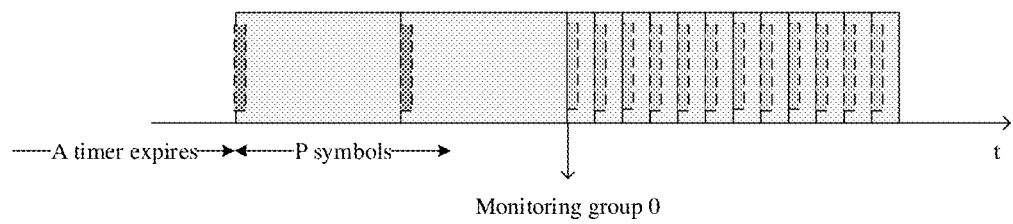
FIG. 3 is another schematic diagram of the principle and effect of the implicit switching of search space groups when the terminal device performs physical channel monitoring.

3) Referring to FIG. 3, if the UE performs PDCCH monitoring according to the search space set in the SS group 1, then the UE performs, starting from first slot after at least P symbols after a slot when a first timer expires, PDCCH monitoring according to the search space set corresponding to the first group identifier, and stops performing PDCCH monitoring according to the search space set corresponding to the second group identifier.

Figure 4:
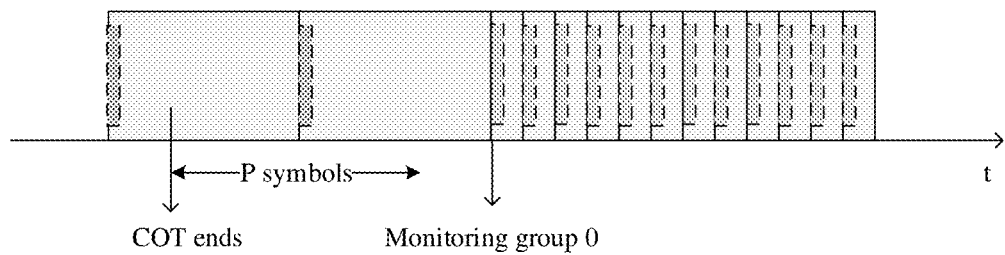
FIG. 4 is another schematic diagram of the principle and effect of the implicit switching of search space groups when the terminal device performs physical channel monitoring.

4) Referring to FIG. 4, if the UE is configured to monitor a DCI format (for example, DCI format 20), then the UE performs, starting from the first slot after at least P symbols after a last symbol of the remaining channel occupation time (COT) of the serving cell indicated by the DCI format, PDCCH monitoring according to the search space set corresponding to the first group identifier, and stops performing PDCCH monitoring according to the search space set corresponding to the second group identifier.

Optionally, if the conditions of above 3) and 4) exist, the UE performs PDCCH monitoring according to the search space set corresponding to the first group identifier, and the slot for stopping performing PDCCH monitoring according to the search space set corresponding to the second group identifier includes a slot that starts firstly in above 3) and 4).

However, if the UE is provided with a search space switching group indication parameter, for example, the UE is configured by the network device with the parameter searchSpaceSwitchingGroupList-r16, which indicates at least one serving cell group, then for one serving cell group in the at least one serving cell group, when the UE performs PDCCH monitoring, the switching behaviors of the SS groups on all cells included in the serving cell group may be the same. However, in the implicit switching manner, how to determine the switching behavior of the search space SS groups on all cells in a serving cell group needs to be further clarified and optimized.

Figure 5:
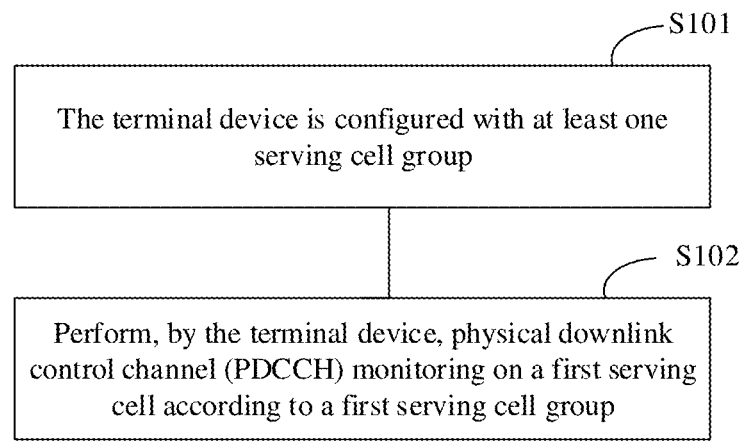
FIG. 5 is a schematic diagram of method for monitoring physical channel according to some embodiments of the present disclosure.

Therefore, the embodiments of the present disclosure provide a method for monitoring a physical channel. Referring to FIG. 5, the method is applicable for a terminal device, and the method includes the following operations.

In step S101, the terminal device is configured with at least one serving cell group.

In step S102, the terminal device performs physical channel monitoring on a first serving cell according to a first serving cell group. The first serving cell is a serving cell included in the first serving cell group, and the first serving cell group is a serving cell group in the at least one serving cell group.

Optionally, the physical channel includes a control channel. Specifically, the control channel includes PDCCH.

Optionally, the physical channel may include a physical channel transmitted between a terminal device and a terminal device, such as, a control channel transmitted between a terminal device and a terminal device. Optionally, the physical channel may include a physical channel transmitted between a network device and a network device, such as, a control channel transmitted between a network device and a network device.

It should be understood that, in the embodiments of the present disclosure, the monitoring of the physical channel is described by taking the monitoring of the PDCCH as an example. If the physical channel to be monitored includes other physical channels, the PDCCH can be replaced with the corresponding physical channel. The present disclosure will not repeat this.

Using the embodiments of the present disclosure, if the terminal device is configured with at least one serving cell group, then for the first serving cell group in the at least one serving cell group and the first serving cell in the first serving cell group, the terminal performs PDCCH monitoring on the first serving cell according to the first serving cell group, so that the switching behaviour of the terminal device for the search space (SS) groups on all cells in a serving cell group can be determined.

It should be understood that, in the embodiments of the present disclosure, a serving cell may also be referred to as a cell. A search space may also be referred to as a search space set. A search space group may also be referred to as a search space set group.

Optionally, in the embodiments of the present disclosure, the operation of the terminal device performing PDCCH monitoring on the first serving cell includes the following operation. The terminal device performs PDCCH monitoring on a downlink active Bandwidth part (BWP) of the first serving cell.

Optionally, in the embodiments of the present disclosure, for the first serving cell, the terminal device is configured with the search space (SS) set including a search space group identifier includes: on the BWP of the first serving cell, the terminal device is configured with the search space (SS) set including a search space group identifier. Optionally, the SS sets on different BWPs in the same serving cell are independently configured. Therefore, on different BWPs in the same serving cell, the same number of SS set groups may be configured, or the different number of SS sets may be configured. For example, it is assumed that the first serving cell includes the first BWP and the second BWP, the first BWP and the second BWP may both include two SS set groups, such as group 0 and group 1. Optionally, the first BWP includes two SS set groups, such as group 0 and group 1, and the second BWP includes one SS set group, such as group 0. Optionally, the first BWP includes two SS set groups, such as group 0 and group 1, and the second BWP does not include SS set group. Optionally, the first BWP includes one SS set group, such as group 0, and the second BWP does not include the SS set group.

Before describing in detail the various implementations of the embodiments of the present disclosure, the switching of the SS groups on the multiple cells in the serving cell group is briefly described firstly. If the terminal device is configured to perform PDCCH monitoring according to serving cell group, for example, the terminal device is provided with a search space switching group indication parameter such as searchSpaceSwitchingGroupList-r16, which indicates one or more serving cell groups, then for first serving cell group in the one or more serving cell groups, the terminal device may perform PDCCH monitoring on at least one cell included in the first serving cell group according to the first serving cell group. Optionally, the switching behaviors of the terminal device for the SS groups on at least two cells in the first serving cell group are the same. Optionally, the switching behaviors of the terminal device for the SS groups on all cells in the first serving cell group are the same.

Optionally, the first serving cell group may be any one of the one or more serving cell groups. Optionally, one cell may be configured to belong to at most one serving cell group. For example, a cell cannot belong to two or more serving cell groups at the same time. For another example, a cell may be configured to belong to one serving cell group, or may not belong to any serving cell group. Optionally, for a cell belonging to the first serving cell group, when the terminal device performs PDCCH monitoring on the cell, the switching behavior of SS group monitoring is consistent with the switching behavior of SS group monitoring of other cells in the first serving cell group.

Optionally, for a search space set, if the configuration parameter corresponding to the search space set does not include a search space group ID parameter, the UE needs to perform PDCCH monitoring according to the search space set. In other words, if a search space set does not correspond to any group identifier, the UE needs to perform PDCCH monitoring according to the search space set.

Optionally, for a search space set, if the search space group ID corresponding to the search space set includes both the first group identifier and the second group identifier, then the UE performing PDCCH monitoring according to the search space set corresponding to the first group identifier or the second group identifier includes performing PDCCH monitoring according to the search space set.

Under different cases, the processing processes of terminal device performing PDCCH monitoring on the first serving cell according to the first serving cell group in the embodiments of the present disclosure are different, and can implement the switching of search space (SS) groups on at least one cell in the serving cell group. The following detailed descriptions are respectively given through a plurality of embodiments.

Example 1

In the embodiment, the terminal device performs PDCCH monitoring on the first serving cell according to the search space (SS) set corresponding to the first group identifier. If the first DCI format is detected by the terminal device on a second serving cell in the first serving cell group according to the SS set corresponding to the first group identifier, the terminal device performs, starting from a first-slot on the first serving cell, PDCCH monitoring on the first serving cell according to a SS set corresponding to a second group identifier, and stops performing PDCCH monitoring according to the SS set corresponding to the first group identifier.

In the above manner, for the first serving cell and the second serving cell belonging to the first serving cell group, if the first DCI format, such as DCI format 2_0 or other DCI formats, is detected on the second serving cell by the terminal device, the terminal device performs switching on SS groups of the first serving cell according to this. Optionally, the first serving cell and the second serving cell may be the same cell. For example, if the first DCI format is detected by the terminal device on the first serving cell, the terminal device performs switching on SS groups of the first serving cell according to this, or the terminal device performs switching on SS groups of the at least cell in the first serving cell group according to this.

It should be noted that the SS groups on different serving cells may be configured independently, so for the same group number on different cells, the corresponding SS groups are different. For example, the SS set corresponding to the first group identifier on the first serving cell is different from the SS set corresponding to the first group identifier on the second serving cell.

Optionally, the first-slot includes a first slot after at least P1 symbols after a last symbol of the PDCCH carrying the first DCI format.

Optionally, the first DCI format may be a first DCI format that is first detected on the second serving cell according to the SS set corresponding to the first group identifier. Optionally, the first DCI format includes any DCI format. For example, the first DCI format may be the DCI format that is first detected on the second serving cell according to the SS set corresponding to the first group identifier.

Optionally, the first-slot may be determined according to the first subcarrier spacing, and the value of P1 symbols may also be determined according to the first subcarrier spacing.

In some embodiments of the present disclosure, the first subcarrier spacing and P1 satisfy at least one of the following relationships:
 a) If the first subcarrier spacing is 15 kHz or the configuration of the first subcarrier spacing is v=0, P1 is greater than or equal to 10;
 b) If the first subcarrier spacing is 30 kHz or the configuration of the first subcarrier spacing is v=1, P1 is greater than or equal to 12;
 c) If the first subcarrier spacing is 60 kHz or the configuration of the first subcarrier spacing is v=2, P1 is greater than or equal to 22;
 d) If the first subcarrier spacing is 120 kHz or the configuration of the first subcarrier spacing is v=3, P1 is greater than or equal to 25.

Optionally, the above at least one case corresponds to UE capability 1.

In some embodiments of the present disclosure, the first subcarrier spacing and P1 satisfy at least one of the following relationships:
 a) If the first subcarrier spacing is 15 kHz or the configuration of the first subcarrier spacing is v=0, P1 is greater than or equal to 5;
 b) If the first subcarrier spacing is 30 kHz or the configuration of the first subcarrier spacing is v=1, P1 is greater than or equal to 5.5;
 c) If the first subcarrier spacing is 60 kHz or the configuration of the first subcarrier spacing is v=2, P1 is greater than or equal to 11.

Optionally, the above at least one case corresponds to UE capability 2.

In some embodiments of the present disclosure, regarding the first subcarrier spacing, optionally, the first-slot and/or the P1 symbols are determined according to the first subcarrier spacing. For example, the first-slot includes the first slot after at least P1 symbols after the last symbol of the PDCCH carrying the first DCI format. The P1 symbols and the first-slot are determined based on the first subcarrier spacing. Of course, the P1 symbols and the first-slot may also be determined according to different subcarrier spacings, which is not limited in the present disclosure.

Optionally, the first subcarrier spacing is the subcarrier spacing corresponding to the second serving cell, or the first subcarrier spacing is the subcarrier spacing corresponding to the first serving cell. For example, the first subcarrier spacing is the subcarrier spacing configured on the active BWP of the second cell, or the first subcarrier spacing is the subcarrier spacing configured on the active BWP of the first cell.

Optionally, the first subcarrier spacing is preset or configured by a network device. For example, the first subcarrier spacing configured by the network device is 15 kHz, or the configuration of the first subcarrier spacing is v=0.

Optionally, the first subcarrier spacing is the minimum subcarrier spacing among subcarrier spacings corresponding to serving cells included in the first serving cell group. For example, if the minimum subcarrier spacing among multiple subcarrier spacings corresponding to multiple active BWPs on multiple cells included in the first serving cell group is 30 kHz, the first subcarrier spacing is 30 kHz. Optionally, if a BWP switching occurs in a cell included in the first serving cell group, the subcarrier spacing corresponding to the cell in the first serving cell group includes the minimum subcarrier spacing before the BWP switching and after the BWP switching. In other words, the first subcarrier spacing is determined according to the minimum subcarrier spacing before the BWP switching and after the BWP switching.

Optionally, the first subcarrier spacing is a maximum subcarrier spacing among subcarrier spacings corresponding to serving cells included in the first serving cell group. Optionally, if a BWP switching occurs in a cell included in the first serving cell group, the first subcarrier spacing is determined according to the maximum subcarrier spacing before the BWP switching and after the BWP switching.

Optionally, the first subcarrier spacing is the minimum subcarrier spacing supported on the unlicensed carrier.

Optionally, the first subcarrier spacing is the maximum subcarrier spacing supported on the unlicensed carrier.

In some embodiments of the present disclosure, the second serving cell includes the serving cell, in which the first DCI format is first detected according to the SS set corresponding to the first group identifier (for example, group 0), or includes any serving cell in the first serving cell group.

In some embodiments of the present disclosure, the second serving cell includes a preset serving cell in the first serving cell group. For example, the second serving cell may be a special cell (SpCell) in the first serving cell group (for example, it may be a primary cell (Pcell) or a primary and secondary cell (PScell)). The second serving cell may also be the serving cell with the minimum cell index in the first serving cell group. The second serving cell may also be the serving cell with the maximum cell index in the first serving cell group. The second serving cell may also be a serving cell indicated by the network device in the first serving cell group. The second serving cell may also be a cell configured in the first serving cell group, for example, a cell configured by the network device through a high layer parameter.

Example 2

In the embodiment, if a second DCI format (such as, DCI format 2_0 or other DCI formats) is detected by the terminal device in at least one SS set on a third serving cell in the first serving cell group, the terminal device sets the first timer to the first timing value.

Optionally, at least one SS set may include any SS set.

Optionally, at least one SS set may correspond to the first group identifier, or may correspond to the second group identifier, or may correspond to both the first group identifier and the second group identifier, or may correspond to neither the first group identifier nor the second group identifier.

Optionally, the first timing value of the first timer may be configured by a high layer, for example, it may be provided by a high layer parameter searchSpaceSwitchingTimer-r16, and the first timing value may be configured to include N time units such as slots, N being a positive integer. Optionally, the first timer may take a time unit such as a slot, a symbol, a subframe, or a subslot (for example, a subslot includes an integer number of symbols less than 14) as a timing unit. For example, the timing unit of the value of the first timer is a slot. After the first timer is set to take a value, the value of the first timer is subtracted by 1 every time one slot passes.

Optionally, the time unit corresponding to the first timer, such as a slot, is determined according to the second subcarrier spacing.

Optionally, each serving cell may be configured with one first timer, or each serving cell group may be configured with one first timer, or multiple serving cell groups may be configured with one first timer, or each terminal device may be configured with a first timer. For example, the first timer may be a timer corresponding to the third serving cell, or the first timer may be a timer corresponding to the first serving cell group, or the first timer may be a timer configured for the UE for SS group switching.

Optionally, the first serving cell and the third serving cell may be the same cell. For example, if the second DCI format is detected by the terminal device in at least one SS set on the first serving cell in the first serving cell group, the terminal device sets the first timer to the first timing value.

Optionally, the third serving cell may be any serving cell in the first serving cell group. Optionally, the third cell includes the cell, in which the second DCI format is detected finally, in the first serving cell group. In other words, every time a second DCI format is detected, the UE sets the first timer to the first timing value. Optionally, the second DCI format includes any DCI format. For example, every time a DCI format is detected by the UE on any serving cell in the first serving cell group, the UE sets the first timer to the first timing value.

In the embodiments of the present disclosure, regarding the second subcarrier spacing, optionally, the first timing value is determined according to the second subcarrier spacing. For example, the first timing value is N slots determined according to the second subcarrier spacing.

Optionally, the second subcarrier spacing may be the subcarrier spacing corresponding to the third serving cell in the first serving cell group, or the second subcarrier spacing may be the subcarrier spacing corresponding to the first serving cell. For example, the second subcarrier spacing is the subcarrier spacing configured on the active BWP of the third cell, or the second subcarrier spacing is the subcarrier spacing configured on the active BWP of the first cell.

Optionally, the second subcarrier spacing is preset or configured by the network device. For example, the second subcarrier spacing configured by the network device is 15 kHz, or the configuration of the second subcarrier spacing is $\mu=0$.

Optionally, the second subcarrier spacing is the minimum subcarrier spacing among subcarrier spacings corresponding to serving cells included in the first serving cell group. For example, if the minimum subcarrier spacing among multiple subcarrier spacings corresponding to multiple active BWPs on multiple cells included in the first serving cell group is 30 kHz, then the second subcarrier spacing is 30 kHz. Optionally, if a BWP switching occurs in a certain cell included in the first serving cell group, the subcarrier spacing corresponding to the cell in the first serving cell group includes the minimum subcarrier spacing before the BWP switching and after the BWP switching. In other words, the second subcarrier spacing is determined according to the minimum subcarrier spacing before the BWP switching and after the BWP switching.

Optionally, the second subcarrier spacing is a maximum subcarrier spacing among subcarrier spacings corresponding to serving cells included in the first serving cell group. Optionally, if BWP switching occurs in the cell included in the first serving cell group, the second subcarrier spacing is determined according to the maximum subcarrier spacing before the BWP switching and after the BWP switching.

Optionally, the second subcarrier spacing is the minimum subcarrier spacing supported on the unlicensed carrier.

Optionally, the second subcarrier spacing is the maximum subcarrier spacing supported on the unlicensed carrier.

Example 3

In the embodiment, if the terminal device performs PDCCH monitoring on the first serving cell according to the SS set corresponding to the second group identifier (for example, group 1), then the terminal device performs, starting from a second slot on the first serving cell, PDCCH monitoring on the first serving cell according to a SS set corresponding to a first group identifier (such as, group 0), and stops performing PDCCH monitoring according to the SS set corresponding to the second group identifier.

Optionally, the second slot may include a first slot after at least P2 symbols after a corresponding slot when a first timer expires.

Optionally, the second slot may also include the first slot after at least P2 symbols after the last symbol of the first remaining channel occupation length. The first remaining channel occupation length includes a remaining channel occupation length with a latest end position in at least one remaining channel occupation length corresponding to service cells in the first serving cell group, or a remaining channel occupation length with an earliest end position in at least one remaining channel occupation length corresponding to the service cells in the first service cell group, or a remaining channel occupation length corresponding to the second serving cell in the first service cell group, or a remaining channel occupation length corresponding to the first serving cell in the first service cell group.

Optionally, the second slot may include a slot that arrives earliest among the above slots. For example, a first slot after at least P2 symbols after a corresponding slot when a first timer expires is the slot m, and the first slot after at least P2 symbols after the last symbol of the first remaining channel occupation length is the slot m+1, the slot m+1 is later than the slot m in time domain, then the second slot includes the slot m.

Optionally, the second slot may include that arrives latest among the above slots. For example, a first slot after at least P2 symbols after a corresponding slot when a first timer expires is the slot m, and the first slot after at least P2 symbols after the last symbol of the first remaining channel occupation length is the slot m+1, the slot m+1 is later than the slot m in time domain, then the second slot includes the slot m+1.

Optionally, the first remaining channel occupation length is determined according to the detected DCI format 2_0, or the first remaining channel occupation length is determined according to a high layer configuration parameter. For example, if the terminal device is configured to monitor DCI format 20, and the DCI format 2_0 includes Slot format indicator (SFI) information or Channel occupancy time (COT) length indication information of at least one serving cell in the first serving cell group, the terminal device may determine the remaining channel occupation length of the at least one serving cell according to DCI format 2_0. For another example, if the system is an NR-U system working on unlicensed spectrum, and the channel access manner of the system is semi-static channel occupation, the terminal device may determine the remaining channel occupation length of the at least one serving cell according to the period channel occupation length configured by the network device for at least one serving cell in the first serving cell group.

Optionally, the remaining channel occupation length may also be considered as the channel occupation length.

In the embodiments of the present disclosure, regarding the third subcarrier spacing, optionally, the second slot may be determined according to the third subcarrier spacing, and/or the P2 symbols may also be determined according to the third subcarrier spacing. For example, the second slot includes the first slot after at least P2 symbols after the corresponding slot when the first timing value expires. The P2 symbols and the second slot are determined according to the third subcarrier spacing. Further, the P2 symbols and the second slot may also be determined according to different subcarrier spacings, which are not limited in the present disclosure.

Optionally, the third subcarrier spacing is the subcarrier spacing corresponding to the second serving cell in the first serving cell group, or, the third subcarrier spacing is the subcarrier spacing corresponding to the first serving cell, or, the third subcarrier spacing is the subcarrier spacing corresponding to the cell corresponding to the first remaining channel occupation length. For example, the third subcarrier spacing is the subcarrier spacing configured on the active BWP of the second cell, or the third subcarrier spacing is the subcarrier spacing configured on the active BWP of the first cell, or the third subcarrier spacing is the subcarrier spacing configured on the active BWP of the cell corresponding to the first remaining channel occupation length.

Optionally, the third subcarrier spacing is preset or configured by the network device. For example, the third subcarrier spacing is 15 kHz, or the third subcarrier spacing configuration is $\mu=0$.

Optionally, the third subcarrier spacing is the minimum subcarrier spacing among subcarrier spacings corresponding to serving cells included in the first serving cell group. For example, if the minimum subcarrier spacing among multiple subcarrier spacings corresponding to multiple active BWPs on multiple cells included in the first serving cell group is 30 kHz, then the third subcarrier spacing is 30 kHz. Optionally, if a BWP switching occurs in a certain cell included in the first serving cell group, the subcarrier spacing corresponding to the cell in the first serving cell group includes the minimum subcarrier spacing before the BWP switching and after the BWP switching. In other words, the third subcarrier spacing is determined according to the minimum subcarrier spacing before the BWP switching and after the BWP switching.

Optionally, the third subcarrier spacing is a maximum subcarrier spacing among subcarrier spacings corresponding to serving cells included in the first serving cell group. Optionally, if a BWP switching occurs in a cell included in the first serving cell group, the third subcarrier spacing is determined according to the maximum subcarrier interval before the BWP switching and after the BWP switching.

Optionally, the third subcarrier spacing is the minimum subcarrier spacing supported on the unlicensed carrier.

Optionally, the third subcarrier spacing is the maximum subcarrier spacing supported on the unlicensed carrier.

In some embodiments of the present disclosure, the third subcarrier spacing and P2 satisfy at least one of the following relationships:
a) If the third subcarrier spacing is 15 kHz or the configuration of the third subcarrier spacing is v=0, P2 is greater than or equal to 10;
b) If the third subcarrier spacing is 30 kHz or the configuration of the third subcarrier spacing is v=1, P2 is greater than or equal to 12;
c) If the third subcarrier spacing is 60 kHz or the configuration of the third subcarrier spacing is v=2, P2 is greater than or equal to 22;
d) If the third subcarrier spacing is 120 kHz or the configuration of the third subcarrier spacing is v=3, P2 is greater than or equal to 25.

Optionally, the above at least one case corresponds to UE capability 1.

In some embodiments of the present disclosure, the third subcarrier spacing and P2 satisfy at least one of the following relationships:
a) If the third subcarrier spacing is 15 kHz or the configuration of the third subcarrier spacing is p=0, P2 is greater than or equal to 5;
b) If the third subcarrier spacing is 30 kHz or the configuration of the third subcarrier spacing is p=1, P2 is greater than or equal to 5.5;
c) If the third subcarrier spacing is 60 kHz or the configuration of the third subcarrier spacing is v=2, P2 is greater than or equal to 11.

Optionally, the above at least one case corresponds to UE capability 2.

In the embodiments of the present disclosure, optionally, the values of P1 and P2 are the same. For example, the values of P1 and P2 are both represented by P.

In the embodiments of the present disclosure, optionally, any two subcarrier spacings among the first subcarrier spacing, the second subcarrier spacing, and the third subcarrier spacing may be the same subcarrier spacing, or may be different subcarrier spacings.

In the embodiment of the present disclosure, optionally, any two serving cells among the first serving cell, the second serving cell, and the third serving cell may be the same serving cell, or may be different serving cells.

Example 4

In the embodiment, for a first serving cell belonging to a first serving cell group, if at least one SS set in the first serving cell is configured with a first group identifier, such as group 0, and no SS set is configured with a second group identifier (for example, at least one SS set on the downlink active BWP in the first serving cell is configured with the first group identifier and no SS set is configured with the second group identifier), then the PDCCH monitoring behavior of the terminal device may include at least one of the following multiple manners.

In the first manner, if the terminal device performs PDCCH monitoring on at least one serving cell in the first serving cell group according to the SS set corresponding to the first group identifier, then the terminal device performs PDCCH monitoring on the first serving cell according to the SS set corresponding to the first group identifier.

In the second manner, if the terminal device performs PDCCH monitoring on at least one serving cell in the first serving cell group according to the SS set corresponding to the second group identifier (such as, group 1), the terminal device does not perform PDCCH monitoring on the first serving cell according to the SS set corresponding to the first group identifier.

In the third manner, if the terminal device performs PDCCH monitoring on at least one serving cell in the first serving cell group according to the SS set corresponding to the second group identifier (such as, group 1), the terminal device performs PDCCH monitoring on the first serving cell according to the SS set corresponding to the first group identifier.

Optionally, for at least one search space set not corresponding to the first group identifier, the terminal device needs to perform PDCCH monitoring according to the at least one search space set. For example, no matter whether the first serving cell group performs PDCCH monitoring according to the search space set corresponding to the first group identifier, or performs PDCCH monitoring according to the search space set corresponding to the second group identifier, for the search space not corresponding to the first group identifier, the terminal device needs to perform PDCCH monitoring on the first serving cell.

In another embodiment, for a first serving cell belonging to the first serving cell group, if no SS set in the first serving cell is configured with the first group identifier (such as, group 0), and no SS set is configured with the second group identifier (such as, group 1) (for example, no SS set on the downlink active BWP in the first serving cell is configured with the first group identifier and no SS set is configured with the second group identifier), then the PDCCH monitoring behavior of the terminal device may include: no matter whether the first serving cell group performs PDCCH monitoring according to the search space set corresponding to the first group identifier, or performs PDCCH monitoring according to the search space set corresponding to the second group identifier, the terminal device needs to perform PDCCH monitoring for SS set configured on the first serving cell.

Optionally, the active BWP of the terminal device on the first serving cell is switched from the first BWP to the second BWP.

Optionally, for a first serving cell belonging to the first serving cell group, if at least one SS set on the second BWP in the first serving cell is configured with a first group identifier such as group 0 and no SS set is configured with the second group identifier. The PDCCH monitoring behavior of the terminal device includes at least one of the following multiple manners.

In the first manner, after the active BWP of the terminal device on the first serving cell is switched to the second BWP, if the terminal device performs PDCCH monitoring on at least one serving cell in the first serving cell group according to the SS set corresponding to the first group identifier, then the terminal device performs PDCCH monitoring on the second BWP in the first serving cell according to the SS set corresponding to the first group identifier.

In the second manner, after the active BWP of the terminal device on the first serving cell is switched to the second BWP, if the terminal device performs PDCCH monitoring on at least one serving cell in the first serving cell group according to the SS set corresponding to the second group identifier (such as, group 1), then the terminal device does not perform PDCCH monitoring on the second BWP in the first serving cell according to the SS set corresponding to the first group identifier.

In the third manner, after the active BWP of the terminal device on the first serving cell is switched to the second BWP, if the terminal device performs PDCCH monitoring on at least one serving cell in the first serving cell group according to the SS set corresponding to the second group identifier (such as, group 1), then the terminal device performs PDCCH monitoring on the second BWP in the first serving cell according to the SS set corresponding to the first group identifier.

Optionally, for a first serving cell belonging to the first serving cell group, if no SS set in the first serving cell is configured with the first group identifier (such as, group 0), and no SS set is configured with the second group identifier (such as, group 1), then the PDCCH monitoring behavior of the terminal device may include: after the active BWP of the terminal device on the first serving cell is switched to the second BWP, no matter whether the first serving cell group performs PDCCH monitoring according to the search space set corresponding to the first group identifier, or performs PDCCH monitoring according to the search space set corresponding to the second group identifier, the terminal device needs to perform PDCCH monitoring for SS set configured on the second BWP in the first serving cell.

In the embodiments of the present disclosure, the active BWP, such as the downlink active BWP, of the terminal device on the first serving cell can be switched from the first BWP to the second BWP. In this case, the terminal device may perform PDCCH monitoring on the second BWP of the first serving cell according to PDCCH monitoring behaviors on other serving cells in the first serving cell group.

Example 5

In the embodiment, for the first serving cell belonging to the first serving cell group, the PDCCH monitoring behavior of the terminal device includes at least one of the following multiple manners.

In the first manner, if the terminal device performs PDCCH monitoring on at least one serving cell in the first serving cell group according to the SS set corresponding to the first group identifier, then the terminal device performs PDCCH monitoring on the first serving cell according to the SS set corresponding to the first group identifier.

In the second manner, if the terminal device performs PDCCH monitoring on at least one serving cell in the first serving cell group according to the SS set corresponding to the second group identifier, then the terminal device performs PDCCH monitoring on the first serving cell according to the SS set corresponding to the second group identifier.

Optionally, the first serving cell includes an SS set corresponding to the first group identifier and an SS set corresponding to the second group identifier.

Optionally, the active BWP of the terminal device on the first serving cell is switched from the first BWP to the second BWP. For example, the PDCCH monitoring behavior of the terminal device includes at least one of the following multiple manners.

In the first manner, after the active BWP of the terminal device on the first serving cell is switched to the second BWP, if the terminal device performs PDCCH monitoring on at least one serving cell in the first serving cell group according to the SS set corresponding to the first group identifier, then the terminal device performs PDCCH monitoring on the second BWP in the first serving cell according to the SS set corresponding to the first group identifier.

In the second manner, after the active BWP of the terminal device on the first serving cell is switched to the second BWP, if the terminal device performs PDCCH monitoring on at least one serving cell in the first serving cell group according to the SS set corresponding to the second group identifier, then the terminal device performs PDCCH monitoring on the second BWP in the first serving cell according to the SS set corresponding to the second group identifier.

In the embodiments of the present disclosure, the active BWP, such as the downlink active BWP, of the terminal device on the first serving cell is switched from the first BWP to the second BWP. In this case, the terminal device may perform PDCCH monitoring on the second BWP of the first serving cell according to PDCCH monitoring behaviors on other serving cells in the first serving cell group.

Example 6

In the embodiment, for a fourth serving cell that does not belong to any serving cell group, when the terminal device performs PDCCH monitoring on the fourth serving cell, the switching behavior of SS groups may be determined according to the explicit switching manner or implicit switching manner of the cell.

Optionally, if the fourth serving cell is configured with a first group identifier such as SS group 0 and is not configured with a second group identifier, the PDCCH monitoring behavior of the terminal device may include at least one of the following manners.

In the first manner, in the case that the switching indication signaling is not provided on the fourth serving cell, for example, the SearchSpaceSwitchTrigger-r16 parameter is not provided or configured, the terminal device performs PDCCH monitoring on the fourth serving cell according to the SS set corresponding to the first group identifier.

In the second manner, in the case where the switching indication signaling is provided on the fourth serving cell, if the switching indication signaling indicates that the PDCCH monitoring is performed according to the search space set corresponding to the first group identifier, the terminal device performs PDCCH monitoring according to the search space set corresponding to the first group identifier. If the switching indication signaling indicates that PDCCH monitoring is performed according to the search space set corresponding to the second group identifier, the UE does not perform PDCCH monitoring according to the search space set corresponding to the first group identifier.

In the third manner, the terminal device always performs PDCCH monitoring according to the search space set corresponding to the first group identifier.

In the fourth manner, for at least one search space set that does not correspond to the first group identifier, the terminal device always needs to perform PDCCH monitoring according to the at least one search space set.

Optionally, the active BWP of the terminal device on the first serving cell is switched from the first BWP to the second BWP.

Optionally, an SS set corresponding to the first group identifier and an SS set corresponding to the second group identifier are included on the first serving cell, and the PDCCH monitoring behavior of the terminal device includes at least one of the following multiple manners.

In the first manner, if the first serving cell includes a first SS set, the first SS set includes at least one SS set, and the first SS set does not belong to the SS set corresponding to the first group identifier, and does not belong to the SS set corresponding the second group identifier, the terminal device performs PDCCH monitoring on the second BWP according to the first SS set.

In the second manner, if the first serving cell includes a second SS set, the second SS set includes at least one SS set, and the second SS set belongs to both the SS set corresponding to the first group identifier and the SS set corresponding to the second group identifier, then the terminal device performs PDCCH monitoring on the second BWP according to the second SS set.

In the third manner, the terminal device performs PDCCH monitoring on the first BWP of the first serving cell according to the SS set corresponding to the first group identifier and detects a DCI format in an SS set corresponding to the first group identifier, and it is assumed that the first slot after at least P symbols after the last symbol of PDCCH carrying the DCI format is the slot A, and the first slot after the active BWP on the first serving cell is switched to the second BWP is slot B. If the slot A is earlier than the slot B, the terminal device performs PDCCH monitoring on the second BWP in the first serving cell according to the SS set corresponding to the second group identifier, and stops PDCCH monitoring according to the search space set corresponding to the first group identifier. Optionally, if the slot A is not earlier than the slot B, then the terminal device performs, starting from the slot A, PDCCH monitoring on the second BWP in the first serving cell according to the SS set corresponding to the second group identifier, and stops PDCCH monitoring according to the search space set corresponding to the first group identifier. Optionally, if the slot A is not earlier than the slot B, the terminal device performs, on the resources from the slot B to the slot A, PDCCH monitoring on the second BWP in the first serving cell according to the SS set corresponding to the first group identifier.

In the fourth manner, the terminal device performs PDCCH monitoring on the first BWP of the first serving cell according to the SS set corresponding to the second group identifier, and it is assumed that the first slot after at least P symbols after the slot when the timer expires is slot C, the first slot after at least P symbols after the last symbol of the channel occupation time (COT) of the first serving cell (if the terminal device can obtain this information) is slot D, the first slot after the active BWP of the first serving cell is switched to the second BWP is slot B. It is assumed that the earlier slot in the time domain between slot C and slot D is slot E. If slot E is earlier than slot B, the terminal device performs PDCCH monitoring on the second BWP in the first serving cell according to the SS set corresponding to the first group identifier, and stops PDCCH monitoring according to the search space set corresponding to the second group identifier. Optionally, if slot E is not earlier than slot B, the terminal device perform, starting from the slot E, PDCCH monitoring on the second BWP in the first serving cell according to the SS set corresponding to the first group identifier, and stops PDCCH monitoring according to the search space set corresponding to the second group identifier. Optionally, if the slot E is not earlier than the slot B, then the terminal device performs, on the resources from the slot B to the slot E, PDCCH monitoring on the second BWP in the first serving cell according to the SS set corresponding to the second group identifier.

Optionally, the slot A is determined according to the subcarrier spacing corresponding to the first BWP, or is determined according to the subcarrier spacing corresponding to the second BWP, or is determined according to the smaller/larger subcarrier spacing in the subcarrier spacings corresponding to the first BWP and the second BWP, or is determined according to a preset/configured subcarrier spacing.

Optionally, the slot B is determined according to the subcarrier spacing corresponding to the first BWP, or is determined according to the subcarrier spacing corresponding to the second BWP, or is determined according to the smaller/larger subcarrier spacing in the subcarrier spacings corresponding to the first BWP and the second BWP, or is determined according to a preset/configured subcarrier spacing.

Optionally, the slot C or the slot corresponding to the timer is determined according to the subcarrier spacing corresponding to the first BWP, or is determined according to the subcarrier spacing corresponding to the second BWP, or is determined according to the smaller/larger subcarrier spacing in the subcarrier spacings corresponding to the first BWP and the second BWP, or is determined according to a preset/configured subcarrier spacing.

Optionally, the slot D is determined according to the subcarrier spacing corresponding to the first BWP, or is determined according to the subcarrier spacing corresponding to the second BWP, or is determined according to the smaller/larger subcarrier spacing in the subcarrier spacings corresponding to the first BWP and the second BWP, or is determined according to a preset/configured subcarrier spacing.

Optionally, the P symbols are determined according to the subcarrier spacing corresponding to the first BWP, or are determined according to the subcarrier spacing corresponding to the second BWP, or are determined according to the smaller/larger subcarrier spacing in the subcarrier spacings corresponding to the first BWP and the second BWP, or are determined according to a preset/configured subcarrier spacing.

Optionally, at least two of the slots A, B, C, and D, the P symbols and the slot corresponding to the timer are determined according to the same subcarrier spacing. Optionally, the slots A, B, C, and D, the P symbols and the slot corresponding to the timer are determined according to the same subcarrier spacing.

Optionally, since the downlink active BWP and the uplink active BWP on the unlicensed carrier may be the same BWP, in the embodiments of the present disclosure, the active BWP of the terminal device on the first serving cell is switched from the first BWP to the first BWP includes: the downlink active BWP of the terminal device on the first serving cell is switched from the first BWP to the second BWP, and/or the uplink active BWP of the terminal device on the first serving cell is switched from the first BWP to Second BWP.

In the embodiments of the present disclosure, the active BWP of the terminal device on the first serving cell may be switched from the first BWP to the second BWP. In this case, the terminal device may determine the PDCCH monitoring behavior on the second BWP on the first serving cell according to the PDCCH monitoring behavior on the first BWP.

In addition to the various embodiments described above, for the first serving cell belonging to the first serving cell group, PDCCH monitoring may also be performed in at least one of the following multiple manners.

In some embodiments of the present disclosure, the terminal device performs PDCCH monitoring on the first serving cell according to the first serving cell.

In some embodiments of the present disclosure, if the first serving cell includes a first SS set, the first SS set includes at least one SS set, and the first SS set does not belong to the SS set corresponding to the first group identifier, and does not belong to the SS set corresponding to the second group identifier, the terminal device performs PDCCH monitoring according to the first SS set.

For the first serving cell belonging to the first serving cell group, in some other embodiments of the present disclosure, in a case where the terminal device is configured with search space switching indication signaling, for example, is configured with search space switching indication signaling corresponding to the first serving cell group, such as SearchSpaceSwitchTrigger-r16 parameter, the terminal device performs PDCCH monitoring on the first serving cell according to the first serving cell group. In other embodiments of the present disclosure, in the case where the terminal device is not configured with search space switching indication signaling, for example, is not configured with search space switching indication signaling corresponding to the first serving cell group, such as SearchSpaceSwitchTrigger-r16 parameter, the terminal device does not perform PDCCH monitoring on the first serving cell according to the first serving cell group. In other embodiments of the present disclosure, in the case where the terminal device does not perform PDCCH monitoring on the first serving cell according to the first serving cell group, the terminal device performs PDCCH monitoring on the first serving cell according to the first serving cell.

In some embodiments of the present disclosure, any two cells among the first serving cell, the second serving cell and the third serving cell may be the same cell or different cells, which can implement the solutions of at least one of the above embodiments.

The following describes the implementation process of the embodiments of the present disclosure by using a schematic example.

For any cell belonging to a serving cell group, such as the first serving cell group, if the UE is configured to perform PDCCH monitoring according to the serving cell group and the UE is not provided with switching indication signaling corresponding to the first serving cell group, for example, the UE is provided or configured with searchSpaceSwitchingGroupList-r16 parameter and is not provided or configured with the SearchSpaceSwitchTrigger-r16 parameter, the UE may be configured with a first timer corresponding to the first serving cell group, the value of the first timer includes N slots. The UE may also determine the reference subcarrier spacing, for example, the reference subcarrier spacing is configured by the network device or is preset as the minimum subcarrier spacing among the subcarrier spacings corresponding to the serving cells included in the first serving cell group. The PDCCH monitoring behavior of the UE may include at least one of the following cases.

On any cell in the first serving cell group, for at least one search space neither corresponding to group 0 nor group 1, the UE needs to perform PDCCH monitoring according to the at least one search space set.

If a DCI format is detected by the UE when performing PDCCH monitoring on any cell in the first serving cell group according to a search space set corresponding to group 0, then the UE performs, starting from the first slot after at least P symbols after the last symbol of the PDCCH carrying the DCI format, PDCCH monitoring on any cell in the first serving cell group according to the search space set corresponding to group 1, and stops performing PDCCH monitoring according to the search space set corresponding to group 0. The P symbols are P symbols determined according to the reference subcarrier spacing, and the first slot is a slot determined according to the reference subcarrier spacing.

If a DCI format is detected by the UE when performing PDCCH monitoring in a search space set on any cell in the first serving cell group, the UE sets or resets the first timer to N slots. The N slots are slots determined according to the reference subcarrier spacing.

If the UE performs PDCCH monitoring on any cell in the first serving cell group according to the search space set corresponding to group 1, then, i) starting from the first slot after at least P symbols after the corresponding slot when the first timer expires, or, ii) if the UE is configured to monitor DCI format 2_0 corresponding to at least one cell in the first serving cell group, starting from the first slot after at least P symbols after the last symbol of the remaining channel occupation length ended at the latest in the first serving cell group indicated by DCI format 2_0, subjecting to the slot that starts first in the time domain in the above two cases i) and ii), the UE performs PDCCH monitoring on any cell in the first serving cell group according to the search space set corresponding to group 0, and stops performing PDCCH monitoring according to the search space set corresponding to group 1. The P symbols are P symbols determined according to the reference subcarrier spacing, and the first slot is the slot determined according to the reference subcarrier spacing.

The specific settings and implementations of the embodiments of the present disclosure have been described above through multiple embodiments from different perspectives. Using at least one of the above embodiments, the switching behavior of search space SS groups on multiple cells in a serving cell group can be effectively determined.

Figure 6:
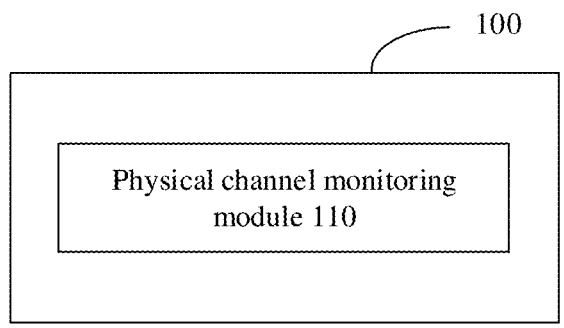
FIG. 6 is a schematic structural block diagram of a terminal device according to some embodiments of the present disclosure.

Corresponding to the processing method of the above at least one embodiment, the embodiments of the present disclosure provide a terminal device 100. Referring to FIG. 6, the terminal device 100 includes a physical channel monitoring module 110.

The physical channel monitoring module 110 is configured to perform PDCCH monitoring on a first serving cell according to a first serving cell group in a case that the terminal device is configured with at least one serving cell group. The first serving cell is a serving cell included in the first serving cell group, and the first serving cell group is a serving cell group in the at least one serving cell group.

Optionally, in the embodiments of the present disclosure, the physical channel monitoring module includes a receiving module and/or a processing module. The receiving module is configured to receive a candidate PDCCH, and the processing module is configured to detect whether the candidate PDCCH includes DCI Format.

Optionally, in the embodiments of the present disclosure, the terminal device performing PDCCH monitoring according to the SS set includes: the terminal device performing PDCCH blind detection according to the candidate PDCCH in the SS set, and determining whether the candidate PDCCH includes DCI information according to the blind detection result. If a DCI format is detected by the terminal device on a certain candidate PDCCH during the PDCCH monitoring process, the terminal device may consider that the candidate PDCCH includes DCI information. If the DCI format is not detected by the terminal device on a certain candidate PDCCH during the PDCCH monitoring process, the terminal device may consider that the candidate PDCCH does not include DCI information.

Optionally, in the embodiments of the present disclosure, the physical channel monitoring module 110 includes a first monitoring submodule and a second monitoring sub-module.

The first monitoring submodule is configured to perform PDCCH monitoring on the first serving cell according to the SS set corresponding to the first group identifier.

The second monitoring submodule is configured to: in a case that in a case that a first DCI format is detected by the first monitoring submodule on a second serving cell in the first serving cell group according to the SS set corresponding to the first group identifier, perform, starting from a first-slot on the first serving cell, PDCCH monitoring on the first serving cell according to a SS set corresponding to a second group identifier, and stop performing PDCCH monitoring according to the SS set corresponding to the first group identifier.

Optionally, in the embodiments of the present disclosure, the physical channel monitoring module 110 includes a timer setting submodule.

The timer setting submodule is configured to set a first timer to a first timing value in a case that a second DCI format is detected by a second format detection submodule in at least one SS set on a third serving cell in the first serving cell group.

Optionally, in the embodiments of the present disclosure, the physical channel monitoring module 110 includes a third monitoring submodule and a fourth monitoring submodule.

The third monitoring submodule is configured to perform PDCCH monitoring on the first serving cell according to a SS set corresponding to the second group identifier.

The fourth monitoring submodule is configured to: in a case that the third monitoring submodule performs PDCCH monitoring on the first serving cell according to the SS set corresponding to the second group identifier, perform, starting from a second slot on the first serving cell, PDCCH monitoring on the first serving cell according to a SS set corresponding to a first group identifier, and stop performing PDCCH monitoring according to the SS set corresponding to the second group identifier.

Optionally, in the embodiments of the present disclosure, the physical channel monitoring module 110 includes a fifth monitoring submodule, a sixth monitoring submodule, a seventh monitoring submodule and a eighth monitoring submodule.

The fifth monitoring submodule is configured to perform PDCCH monitoring on at least one serving cell in the first serving cell group according to a SS set corresponding to the first group identifier.

The sixth monitoring submodule is configured to perform PDCCH monitoring on the first serving cell according to the SS set corresponding to the first group identifier in a case that the fifth monitoring submodule performs PDCCH monitoring on at least one serving cell in first serving cell group according to a SS set corresponding to a first group identifier.

The seventh monitoring submodule is configured to perform PDCCH monitoring on at least one serving cell in the first serving cell group according to a SS set corresponding to the second group identifier.

The eighth monitoring sub-module is configured to perform PDCCH monitoring on the first serving cell according to the SS set corresponding to the second group identifier in a case that the seventh monitoring submodule performs PDCCH monitoring on the at least one serving cell in first serving cell group according to a SS set corresponding to a second group identifier.

Optionally, in the embodiments of the present disclosure, the first serving cell includes a SS set corresponding to the first group identifier and does not include a SS set corresponding to the second group identifier. The physical channel monitoring module 110 includes a ninth monitoring submodule, a tenth monitoring submodule, an eleventh monitoring submodule and a twelfth monitoring submodule.

The ninth monitoring submodule is configured to perform PDCCH monitoring on at least one serving cell in the first serving cell group according to the SS set corresponding to the first group identifier.

The tenth monitoring submodule is configured to perform PDCCH monitoring on the first serving cell according to the SS set corresponding to the first group identifier in a case that the ninth monitoring submodule performs PDCCH monitoring on at least one serving cell in the first serving cell group according to the SS set corresponding to the first group identifier.

The eleventh monitoring submodule is configured to perform PDCCH monitoring on at least one serving cell in the first serving cell group according to the SS set corresponding to the second group identifier.

The twelfth monitoring submodule is configured to perform PDCCH monitoring on the first serving cell according to the SS set corresponding to the first group identifier in a case that the eleventh monitoring submodule performs PDCCH monitoring on the at least one serving cell in the first serving cell group according to the SS set corresponding to the second group identifier.

Optionally, in the embodiments of the present disclosure, the terminal device 100 further includes a switching processing module.

The switching processing module is configured to switch the active bandwidth part (BWP) on the first serving cell from a first BWP to a second BWP.

Optionally, in the embodiments of the present disclosure, the physical channel monitoring module 110 includes a thirteenth monitoring submodule and a fourteenth monitoring submodule.

The thirteenth monitoring submodule is configured to perform PDCCH monitoring on the second BWP on the first serving cell according to the SS set corresponding to the first group identifier.

The fourteenth monitoring sub-module is configured to perform PDCCH monitoring on the second BWP on the first serving cell according to the SS set corresponding to the second group identifier.

Optionally, in the embodiments of the present disclosure, the physical channel monitoring module 110 includes a fifteenth monitoring submodule.

The fifteenth monitoring submodule is configured to perform PDCCH monitoring according to the first SS set in a case that the first serving cell includes a first SS set, and the first SS set does not belong to a SS set corresponding to a first group identifier and does not belong to a SS set corresponding to a second group identifier.

Optionally, in the embodiments of the present disclosure, the physical channel monitoring module 110 includes a sixteenth monitoring submodule.

The sixteenth monitoring sub-module is configured to perform PDCCH monitoring on the first serving cell according to the first serving cell group in a case that the terminal device is configured with a search space switching indication signaling.

Optionally, in the embodiments of the present disclosure, the sixteenth monitoring submodule is configured to not perform PDCCH monitoring on the first serving cell according to the first serving cell group in a case that the terminal device is not configured with a search space switching indication signaling.

Optionally, in the embodiments of the present disclosure, the terminal device 100 further includes the seventeenth monitoring submodule.

The seventeenth monitoring submodule is configured to perform PDCCH monitoring on the first serving cell according to the first serving cell.

The terminal device 100 in the embodiments of the present disclosure can implement the corresponding functions described in the above method embodiments. For the corresponding functions, implementation manners, and beneficial effects of various modules (submodules, units, or components, etc.) in the terminal device 100, please refer to the above corresponding descriptions in the method embodiments, which are not repeated here.

It should be noted that the functions of the various modules (submodules, units, or components, etc.) in the terminal device 100 described in the embodiments of the present disclosure may be implemented by different modules (submodules, units, or components, etc.), or may be implemented by the same module (submodule, unit, or component, etc.). For example, the first monitoring submodule and the second monitoring submodule may be different modules, or may be the same module, both of which can implement corresponding functions of the terminal device in the embodiments of the present disclosure.

Figure 7:
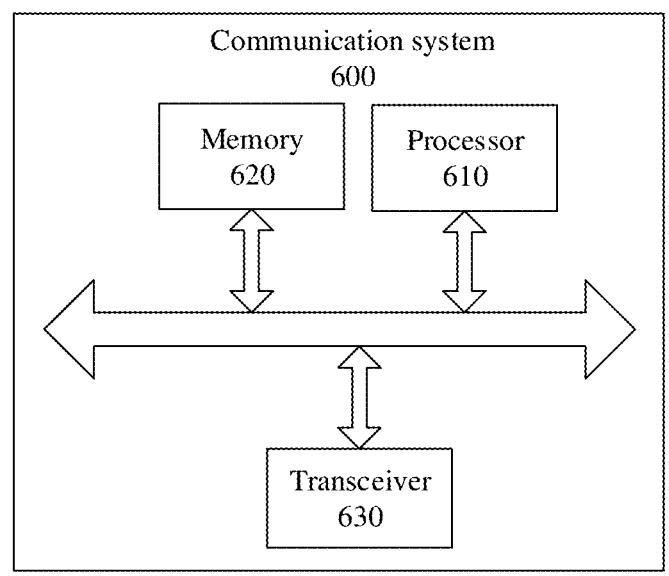
FIG. 7 is a schematic block diagram of a communication device according to some embodiments of the present disclosure.

FIG. 7 is a schematic structural diagram of a communication device 600 according to the embodiments of the present disclosure. The communication device 600 includes a processor 610, and the processor 610 can invoke and execute a computer program from a memory to implement the methods in the embodiments of the present disclosure.

Optionally, the communication device 600 may also include a memory 620. The processor 610 may invoke and execute a computer program from the memory 620 to implement the methods in the embodiments of the present disclosure.

The memory 620 may be a separate device independent of the processor 610, or may be integrated in the processor 610.

Optionally, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include antennas, and the number of the antennas may be one or more.

Optionally, the communication device 600 may be the network device of the embodiments of the present disclosure, and the communication device 600 may implement the corresponding processes implemented by the network device in various methods in the embodiments of the present disclosure, which is not repeated here for brevity.

Optionally, the communication device 600 may be a terminal device in the embodiments of the present disclosure, and the communication device 600 may implement corresponding processes implemented by the terminal device in various methods in the embodiment of the present disclosure, which is not repeated here for brevity.

Figure 8:
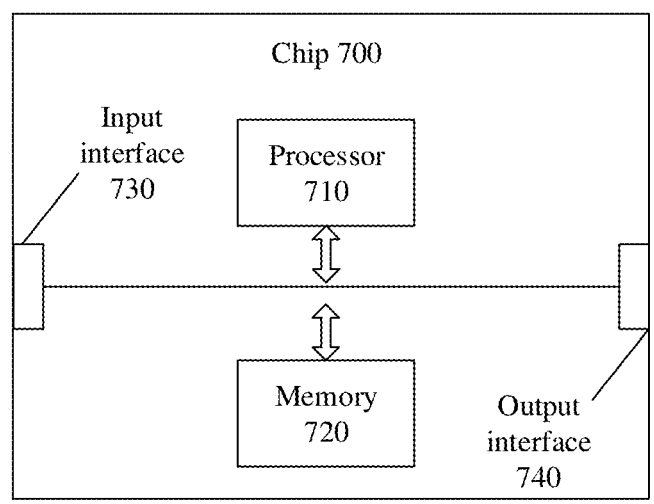
FIG. 8 is a schematic block diagram of a chip according to some embodiments of the present disclosure.

FIG. 8 is a schematic structural diagram of a chip 700 according to the embodiments of the present disclosure. The chip 700 includes a processor 710, and the processor 710 may invoke and execute a computer program from a memory to implement the methods in the embodiments of the present disclosure.

Optionally, the chip 700 may further include a memory 720. The processor 710 may invoke and execute a computer program from the memory 720 to implement the methods in the embodiments of the present disclosure.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the input interface 730 may acquire information or data sent by other devices or chips.

Optionally, the chip 700 may further include an output interface 740. The processor 710 may control the output interface 740 to communicate with other devices or chips. Specifically, the output interface 740 may output information or data to other devices or chips.

Optionally, the chip may be applicable for the network device in the embodiments of the present disclosure, and the chip may implement the corresponding processes implemented by the network device in various methods of the embodiments of the present disclosure, which is not repeated here for brevity.

Optionally, the chip may be applicable for the terminal device in the embodiments shown in FIG. 6 of the present disclosure, and the chip can implement the corresponding processes implemented by the terminal device in various methods of the embodiments of the present disclosure, which is not repeated here for brevity.

It should be understood that the chip mentioned in the embodiments of the present disclosure may also be referred to as a system level chip, chip system, system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable ROM (PROM), erasable RPOM (EPROM), electrically EPROM (EEPROM) or flash memory. The volatile memory may be random access memory (RAM).

It should be understood that the above memory is an example but not a limitative description. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a Direct Rambus RAM (DR RAM) and so on. That is, the memory in the embodiments of the present disclosure is intended to include but not limited to these and any other suitable types of memory.

Figure 9:
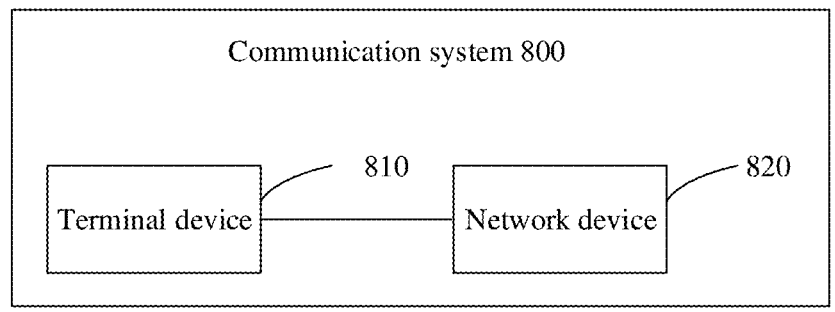
FIG. 9 is a schematic block diagram of a communication system according to some embodiments of the present disclosure.

FIG. 9 is a schematic block diagram of a communication system 800 according to the embodiments of the present disclosure. The communication system 800 includes a terminal device 810 and a network device 820.

The terminal device 810 may be used to implement the corresponding functions implemented by the terminal device in the methods of the various embodiments of the present disclosure, and the network device 820 may be used to implement the corresponding functions implemented by the network device in the methods of the various embodiments of the present disclosure, which are not repeated here for brevity.

The above embodiments may be implemented in whole or in part by software, hardware, firmware or any combination thereof. When implemented in software, the above embodiments may be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or other programmable device. The computer instructions may be stored in a computer readable storage medium, or be transmitted from one to another computer readable storage medium, for example, the computer instructions may be transmitted over a wire manner (e. g, coaxial cable, optical fiber, Digital Subscriber Line (DSL)) or over wireless (e. g, infrared, wireless, microwave, etc.) from a website site, computer, server or data center to another website site, computer, server or data center. The computer readable storage medium may be any available medium that can be accessed by a computer or a data storage device such as a server, data center, etc. that includes one or more integrated available media. The available media may be magnetic media (e. g, floppy disks, hard disks, magnetic tapes), optical media (e. g, DVD), or semiconductor media (e. g, Solid State Disk (SSD)), among others.

It should be understood that, in various embodiments of the present disclosure, the size of the sequence numbers of the above processes does not mean the sequence of execution, and the execution sequence of each process should be determined by its functions and internal logic, which should not constitute any limitation on the implementation process of the embodiments of the present disclosure.

Those skilled in the art can clearly understand that, for the convenience and brevity of description, the specific working process of the above systems, devices and units can refer to the corresponding processes in the above method embodiments, which will not be repeated here.

The above are only specific embodiments of the present disclosure, but the protection scope of the present disclosure is not limited to this. Any person skilled in the art can easily think of changes or substitutions within the technical scope disclosed in the present disclosure, which should be covered within the protection scope of the present disclosure. Therefore, the scope of protection of the present disclosure should be subject to the scope of protection of the claim.

What is claimed is:

1. A method for monitoring a physical channel, applicable for a terminal device, comprising:
    performing, by the terminal device, physical downlink control channel (PDCCH) monitoring on a first serving cell according to a first serving cell group, wherein the terminal device is configured with at least one serving cell group, wherein the first serving cell is a serving cell comprised in the first serving cell group, and the first serving cell group is a serving cell group in the at least one serving cell group, wherein performing, by the terminal device, PDCCH monitoring on the first serving cell according to the first serving cell group comprises:

performing, by the terminal device, PDCCH monitoring on the first serving cell according to a search space, SS, set corresponding to a first group identifier;

in response to detecting a first DCI format on a second serving cell in the first serving cell group by the terminal device according to the SS set corresponding to the first group identifier, performing, by the terminal device, starting from a first-slot on the first serving cell, PDCCH monitoring on the first serving cell according to a SS set corresponding to a second group identifier, and stopping performing PDCCH monitoring according to the SS set corresponding to the first group identifier;

in response to detecting a second DCI format by the terminal device in at least one SS set on a third serving cell in the first serving cell group, setting, by the terminal device, a first timer to a first timing value;

wherein the first-slot comprises a first slot after at least P1 symbols after a last symbol of the PDCCH carrying the first DCI format; and a slot corresponding to the first timer is determined according to a second subcarrier spacing, and the second subcarrier spacing is a minimum subcarrier spacing among subcarrier spacings corresponding to serving cells comprised in the first serving cell group.

2. The method of claim 1, wherein performing, by the terminal device, PDCCH monitoring on the first serving cell according to the first serving cell group comprises:

in response to performing PDCCH monitoring on the first serving cell by the terminal device according to a SS set corresponding to a second group identifier, performing, by the terminal device, starting from a second slot on the first serving cell, PDCCH monitoring on the first serving cell according to the SS set corresponding to the first group identifier, and stopping performing PDCCH monitoring according to the SS set corresponding to the second group identifier.

3. The method of claim 2, wherein the second slot comprises a first slot after at least P2 symbols after a corresponding slot when the first timer expires; or wherein the second slot comprises a first slot after at least P2 symbols after a last symbol of a first remaining channel occupation length, wherein the first remaining channel occupation length comprises a remaining channel occupation length with a latest end position in at least one remaining channel occupation length corresponding to service cells in the first serving cell group, or a remaining channel occupation length with an earliest end position in at least one remaining channel occupation length corresponding to the service cells in the first service cell group, or a remaining channel occupation length corresponding to the second serving cell in the first service cell group, or wherein the second slot is a slot that arrives earliest among the above slots.

4. The method of claim 3, wherein P2 symbols are determined according to a third subcarrier spacing.

5. The method of claim 4, wherein, in response to the third subcarrier spacing being 15 kHz or a configuration of the third subcarrier spacing being $\mu=0$, P2 is greater than or equal to 10; or in response to the third subcarrier spacing being 30 kHz or the configuration of the third subcarrier spacing being $\mu=1$, P2 is greater than or equal to 12; or in response to the third subcarrier spacing being 60 kHz or the configuration of the third subcarrier spacing being $\mu=2$, P2 is greater than or equal to 22; or in response to the third subcarrier spacing being 120 kHz or the configuration of the third subcarrier spacing being $\mu=3$, P2 is greater than or equal to 25.

6. The method of claim 4, wherein, in response to the third subcarrier spacing being 15 kHz or a configuration of the third subcarrier spacing $\mu=0$, P2 is greater than or equal to 5; or in response to the third subcarrier spacing being 30 kHz or the configuration of the third subcarrier spacing being $\mu=1$, P2 is greater than or equal to 5.5; or in response to the third subcarrier spacing being 60 kHz or the configuration of the third subcarrier spacing being $\mu=2$, P2 is greater than or equal to 11.

7. The method of claim 2, wherein the second slot is determined according to a third subcarrier spacing.

8. The method of claim 7, wherein, the third subcarrier spacing is a minimum subcarrier spacing among subcarrier spacings corresponding to serving cells comprised in the first serving cell group.

9. The method of claim 1, wherein the first-slot is determined according to a first subcarrier spacing.

10. The method of claim 1, wherein P1 symbols are determined according to a first subcarrier spacing.

11. The method of claim 10, wherein, in response to the first subcarrier spacing being 15 kHz or a configuration of the first subcarrier spacing being $\mu=0$, P1 is greater than or equal to 10; or in response to the first subcarrier spacing being 30 kHz or the configuration of the first subcarrier spacing being $\mu=1$, P1 is greater than or equal to 12; or in response to the first subcarrier spacing being 60 kHz or the configuration of the first subcarrier spacing being $\mu=2$, P1 is greater than or equal to 22; or in response to the first subcarrier spacing being 120 kHz or the configuration of the first subcarrier spacing being $\mu=3$, P1 is greater than or equal to 25.

12. The method of claim 10, wherein, in response to the first subcarrier spacing being 15 kHz or a configuration of the first subcarrier spacing being $\mu=0$, P1 is greater than or equal to 5; or in response to the first subcarrier spacing being 30 kHz or the configuration of the first subcarrier spacing being $\mu=1$, P1 is greater than or equal to 5.5; or in response to the first subcarrier spacing being 60 kHz or the configuration of the first subcarrier spacing being $\mu=2$, P1 is greater than or equal to 11.

13. The method of claim 10, wherein, the first subcarrier spacing is a minimum subcarrier spacing among subcarrier spacings corresponding to serving cells comprised in the first serving cell group.

14. The method of claim 1, wherein, the first timer takes a slot as a timing unit, and after the first timer is set to take a value, the value of the first timer is subtracted by 1 every time one slot passes.

15. A terminal device, comprising a processor and a memory, wherein the memory is configured to store a computer program, the processor invokes and executes the computer program stored in the memory, and performs the following operations:
- performing physical downlink control channel (PDCCH) monitoring on a first serving cell according to a first serving cell group in a case that the terminal device is configured with at least one serving cell group,
- wherein the first serving cell is a serving cell comprised in the first serving cell group, and the first serving cell group is a serving cell group in the at least one serving cell group,
- wherein performing the PDCCH monitoring on the first serving cell according to the first serving cell group comprises:
- performing the PDCCH monitoring on the first serving cell according to a search space, SS, set corresponding to a first group identifier;
- in response to detecting a first DCI format on a second serving cell in the first serving cell group by the terminal device according to the SS set corresponding to the first group identifier, performing, starting from a first-slot on the first serving cell, PDCCH monitoring on the first serving cell according to a SS set corresponding to a second group identifier, and stopping performing PDCCH monitoring according to the SS set corresponding to the first group identifier;
- in response to detecting a second DCI format by the terminal device in at least one SS set on a third serving cell in the first serving cell group, setting a first timer to a first timing value;
- wherein the first-slot comprises a first slot after at least P1 symbols after a last symbol of the PDCCH carrying the first DCI format; and
- a slot corresponding to the first timer is determined according to a second subcarrier spacing, and the second subcarrier spacing is a minimum subcarrier spacing among subcarrier spacings corresponding to serving cells comprised in the first serving cell group.

* * * * *